United States Patent Office 3,100,147
Patented Aug. 6, 1963

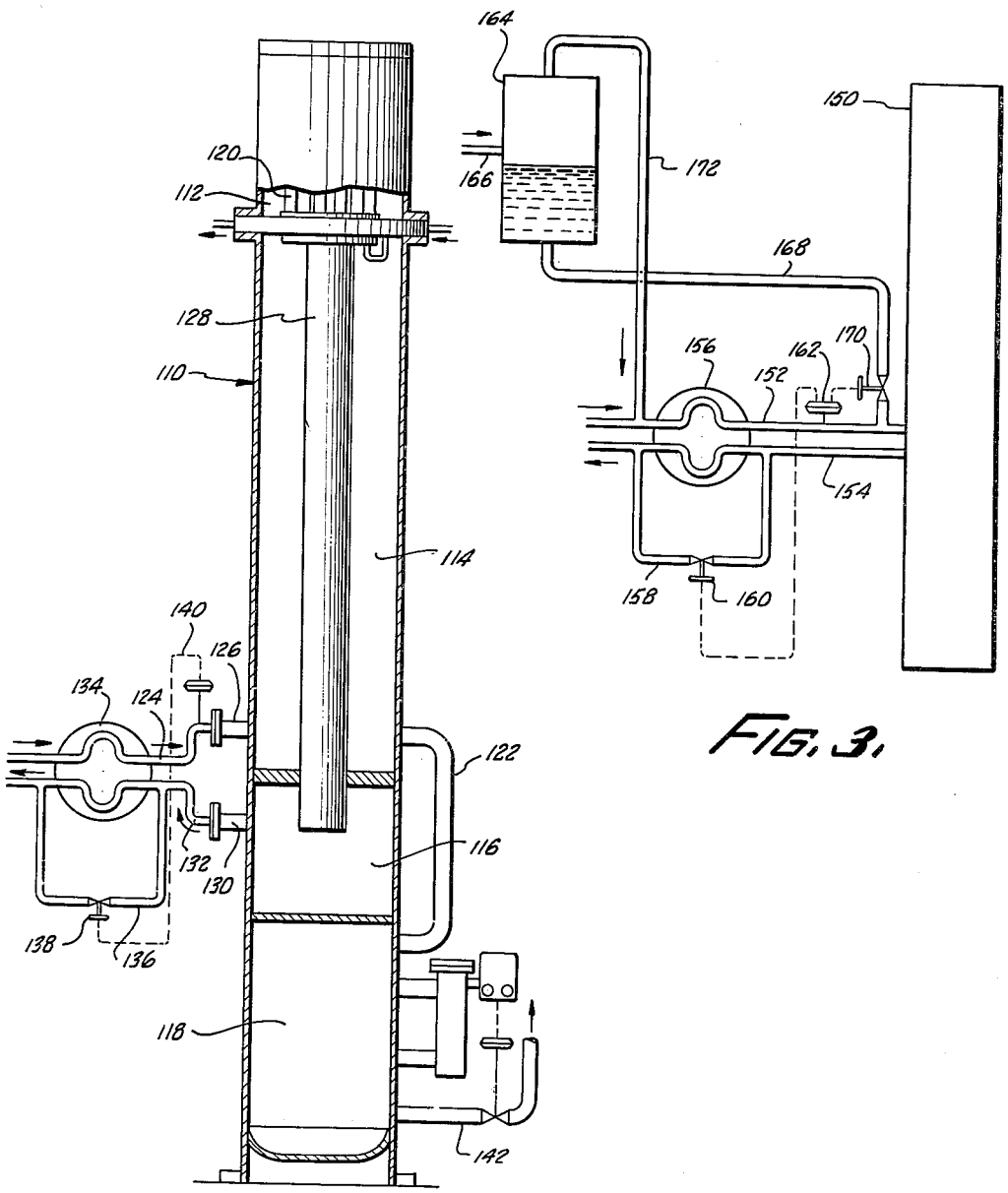

3,100,147
APPARATUS AND METHODS FOR TREATMENT OF NATURAL GAS
Raymond James Hull, Orange, Calif., assignor to Gas Processing Inc., Fullerton, Calif., a corporation of California
Filed Aug. 3, 1960, Ser. No. 47,221
3 Claims. (Cl. 62—37)

This invention relates to natural gas treatment and, more specifically, to apparatus particularly useful in improving the over-all operating efficiency of gas treating apparatus in which condensable liquids are removed from natural gas. The invention also relates to methods by which improvements in over-all operating efficiency are attained in the treatment of natural gas.

The term "natural gas" refers to the gaseous mixture of hydrocarbon compounds produced from subterranean reservoirs. Such gas, particularly when found underground in association with oil, contains relatively large amounts of hydrocarbon constituents higher in molecular weight than propane and, in such state, is called wet natural gas. The wet gas may be processed to yield two products, one being "casinghead gas" or "natural gasoline," a liquid product composed of the more readily condensable hydrocarbons in the wet gas, and the other being dry natural gas. In addition, natural gas, as obtained at the well-head of a producing well, frequently contains condensable water.

The presence of condensable constituents in natural gas as it is produced requires that the gas be treated before it is placed in gas transmission systems. Otherwise, condensation of liquids occurs within pipelines with a consequent adverse effect on operations of the transmission system. In addition, the presence of both condensable hydrocarbons and water can result in the formation of gas hydrates within the pipeline with resultant reduction in the flow capacity of the transmission system. Further, natural gasoline is itself a valuable product so that its removal prior to sale of the natural gas is of economic benefit to the producer.

The process for treating natural gas generally used in conventional treating plants may be classified either as an absorption process or as a low-temperature recovery process.

The absorption process is particularly used in large capacity installations. After compression and cooling of the wet natural gas to condenser water temperature, hydrocarbon constituents are removed from the natural gas by a suitable absorption solvent. Removal of water from the gas requires the use of dehydrating agents such as the glycols.

The low-temperature recovery process, while better adapted for small capacity installations, involves compression of the gas followed by cooling to low temperatures and, generally, simultaneous treatment with dehydrating agents. A regenerative cycle to recover the dehydrating agent must be included as part of such a process.

The expense of conventional gas treating plants causes many instances to arise where natural gas is wasted by venting to the atmosphere or it is not produced because the installation of a treating plant cannot be economically justified. This particularly occurs where the discovered gas reservoir is small in size, or its location it remote or the true capacity of the reservoir has not been sufficiently defined to show an economic balance in favor of a treating plant. Even though gas transmission facilities are available, the untreated natural gas cannot therefore be marketed.

A need exists for processing equipment designed so that the maximum number of treating steps are carried out in a single unit. In this manner, it would be possible not only to reduce the cost of gas treating equipment but to make such equipment semi-portable. Treating of natural gas could then be done under circumstances which preclude installation of large conventional gas treating plants.

In my copending application, Serial No. 701,581, filed December 9, 1957, now Patent No. 2,964,915, I disclosed an apparatus for the treatment of natural gas to remove the condensable hydrocarbons and water from the gas. The refrigerating rectifier disclosed therein comprises an elongated vertical shell closed at its longitudinal ends to form a fluid-tight enclosure. A feed gas inlet is provided so that wet feed gas can flow into the enclosure. A first tubular heat exchanging means is provided within the enclosure to pre-cool the feed gas and thereby to remove by condensation a part of the condensable hydrocarbons and water in the wet gas. A second tubular heat exchanging means is also provided within the enclosure above the first heat exchanging means and is adapted to receive interiorly a refrigerating fluid. The second heat exchanging means further cools the feed gas and thereby removes additional condensable hydrocarbons and water from the gas. Means are provided for directing feed gas upwardly across the exteriors of the first and second heat exchanging means successively. The gas passing across the second heat exchanging means is then directed into the interior of one end of the first heat exchanging means. The liquids condensed as a result of the gas passing across the second heat exchanging means are directed downwardly in counter-current heat transfer relationship with the feed gas. A gas outlet is provided in communication with the interior of the first heat exchanging means. A liquid outlet is provided in the lower part of the enclosure.

The passage of wet natural gas through the refrigerating rectifier of the invention described in my copending application removes both water and condensable hydrocarbons from the wet gas so that a dry natural gas, suitable for pipeline transmission, is produced. Furthermore, the hydrocarbons, condensed from the wet gas, are fractionated and stripped of some of the light, high vapor-pressure components, namely, methane, ethane, and propane, within the rectifier by utilizing the heat of the incoming feed gas. The liquid hydrocarbon product thus obtained may thereupon be further stabilized, if desired, by treatment in a stabilizing column.

I have found that the over-all operating efficiency may be improved by further utilizing the cold dry natural gas leaving the refrigerating rectifier to pre-cool feed natural gas exteriorly of the rectifier. For this purpose, a high-velocity heat exchanger having a high heat transfer factor is adapted so that the cold dry natural gas leaving the rectifier and the feed natural gas pass through it in indirect heat transfer relationship. So long as the temperature differential between the gases respectively entering the heat exchanger is in excess of about 10° F., advantage is taken of the relatively cold temperature of the dry natural gas to pre-cool the feed natural gas. It is desirable that the feed natural gas enter the refrigerating rectifier at as low a temperature as can be attained, consistent with over-all operating efficiency, in that the amount of water entering the rectifier is reduced and, further, in the case of many natural gases, the yield of intermediate hydrocarbon components, such as the pentane fraction, is increased within the rectifier.

In the use of an exterior high-velocity heat exchanger as heretofore described, it is necessary that cooling of the feed natural gas be limited so that it is not cooled to its hydrate temperature. The hydrate temperature refers to the temperature at which hydrocarbon products combine with water to form a solid product, and will vary dependent upon the amount and kind of the hydrocarbon components of the natural gas. If hydrate formation occurs within the exterior high-velocity heat exchanger, blocking of flow passages occurs and the heat transfer surfaces are fouled so that the heat transfer factor is markedly reduced.

One aspect of my present invention is apparatus for treatment of a stream of natural gas and used in combination with a refrigerating rectifier including a feed gas inlet and a treated gas outlet. The apparatus includes a feed gas conduit connecting the feed gas inlet and a source of feed gas, and a treated gas conduit connecting the treated gas outlet and a place of storage or point of distribution. A heat exchanging means, exterior of the refrigerating rectifier, is adapted to the feed gas conduit and the treated gas conduit whereby the feed gas and treated gas flow through it in indirect heat transfer relationship. Temperature responsive means are positioned in the feed gas conduit between the heat exchanging means and the feed gas inlet so as to be responsive to the temperature of the feed gas after it passes through the heat exchanging means. A bypass conduit is connected to the treated gas conduit to provide a bypass around the heat exchanging means for treated gas. Flow-control means are located in the bypass conduit. The temperature responsive means is adapted to the flow-control means so that the amount of treated gas passing through the bypass conduit is responsive to the temperature of the feed gas leaving the heat exchanging means.

Another aspect of my present invention is a method for treatment of a natural gas having a given hydrate temperature. The method includes the step of cooling feed natural gas within a refrigerating rectifier by flowing it over at least a refrigerating heat exchanger to remove substantially all of the water and condensable hydrocarbons. The feed natural gas is precooled before it enters the refrigerating rectifier by passing it in indirect heat transfer relationship with cold dry natural gas leaving the rectifier. The amount of cold dry natural gas passing in indirect heat transfer relationship with the feed natural gas is adjusted whereby the temperature of the feed natural gas is not reduced below its hydrate temperature.

The apparatus and process of my invention heretofore described result in the accrual of the advantages realized by utilizing the cold dry natural gas to precool feed natural gas while avoiding the difficulties resulting from the formation of hydrates within the exterior high-velocity heat exchanger.

In conjunction with the use of an exterior heat exchanger, I have further found that an improvement in net refrigeration effect for the over-all system can be attained by the addition to the feed natural gas of liquid hydrocarbon components after the feed natural gas has been cooled by the cold dry natural gas as previously described. In the conventional processing of natural gas as it comes from the producing well, two basic streams result. The first is a high-pressure stream from high-pressure crude oil traps, this being the stream treated in conventional treating apparatus and in the refrigerating rectifier of my invention as has been described. The second is a low-pressure stream of gas derived from secondary crude oil traps, crude oil heaters, tanks and the like. Commonly, the ratio of the high-pressure stream to the low-pressure stream is of the order of 5:1. The low-pressure stream almost invariably contains a higher content of propane, butane, and higher molecular weight hydrocarbons than does the high-pressure stream.

Conventionally, the low-pressure gas stream is compressed, cooled and combined with the high-pressure gas stream before the combined stream enters the treating apparatus for removal of water and condensable hydrocarbons. I have found, however, that a considerable net refrigeration effect may be obtained by separating the compressed and cooled low-pressure gas stream into liquid and gaseous phases in a conventional separator and adding the gas phase to the feed natural gas entering the exterior heat exchanger and adding the liquid phase to the cooled feed natural gas leaving the exterior heat exchanger. When the liquid phase is added in this manner, evaporation of certain hydrocarbon constituents, such as propane, occurs with resultant cooling of the feed natural gas. By controlling the amount of liquid phase added responsive to the temperature of the feed natural gas leaving the exterior heat exchanger, the degree of further cooling of the feed natural gas can be controlled so that its temperature does not reach the hydrate temperature.

By adding liquid phase hydrocarbons in the manner described, it is possible to reduce the total refrigeration requirement in the rectifier by as much as one-third. If both the liquid and gas phases of the low-pressure stream were added to the high-pressure stream before the exterior heat exchanging means, the cooling effect of the liquid coming to equilibrium with the main high-pressure stream would be dissipated in part in the treated dry natural gas stream. By injecting the liquid phase after the exterior heat exchanging means, the refrigeration effect is conserved in the over-all process. As to the injected liquid phase, the requirement is that it be richer in vaporizable components than any liquid which may be in equilibrium with the feed natural gas.

Accordingly, another aspect of my present invention is apparatus for treatment of a stream of natural gas and used in combination with a refrigerating rectifier including a feed gas inlet and a treated gas outlet. A feed gas conduit connects the feed gas inlet and a source of feed gas, and a treated gas conduit connects the treated gas outlet and a place of storage or a point of distribution. Heat exchanging means, exterior of the refrigerating rectifier, are adapted to the feed gas conduit and the treated gas conduit whereby the feed gas and treated gas flow in indirect heat transfer relationship through the heat exchanging means. Temperature responsive means are positioned in the feed gas conduit between the heat exchanging means and the feed gas inlet so as to be responsive to the temperature of the feed gas after it passes through the heat exchanging means. A liquid conduit, connected to the feed gas conduit between the heat exchanging means and the feed gas inlet, joins the feed gas conduit to a source of liquid hydrocarbons. Flow-control means are positioned in the liquid conduit. The temperature responsive means is adapted to the flow-control means so that the amount of liqund passing through the liquid conduit and into the feed gas conduit is responsive to the temperature of the feed gas.

The apparatus described may be advantageously employed with the apparatus previously described for controlling cooling of the feed gas within the heat exchanging means so that the hydrate temperature of the feed gas is not attained. The flow-control means within the liquid conduit may be set so that, in response to the temperature responsive means, the amount of liquid added will be the amount sufficient to cool the feed gas leaving the exterior heat exchanging means down to the hydrate temperature.

Another aspect of my present invention is a method for treatment of a natural gas including the step of cooling feed natural gas within a refrigerating rectifier by flowing it over at least a refrigerating heat exchanger to remove substantially all of the water and condensable hydrocarbons. The feed natural gas is precooled before it enters the refrigerating rectifier by passing it in indirect heat transfer relationship with cold dry natural gas leaving the rectifier. The feed natural gas is further precooled by adding to it before it enters the rectifier liquid hydrocarbon richer in vaporizable components than any liquid in equilibrium with the feed natural gas.

The apparatus and methods of my present invention as well as their respective advantages and manner of operation will be more clearly understood from the following description made in conjunction with the accompanying drawings in which:

FIG. 2 is a schematic representation of the apparatus of the aspect of my invention shown in FIG. 1 in combination with a partially sectioned elevation of another embodiment of a refrigerating rectifier; and FIG. 3 is a schematic representation of the apparatus of another aspect of my invention.

Figure 1:
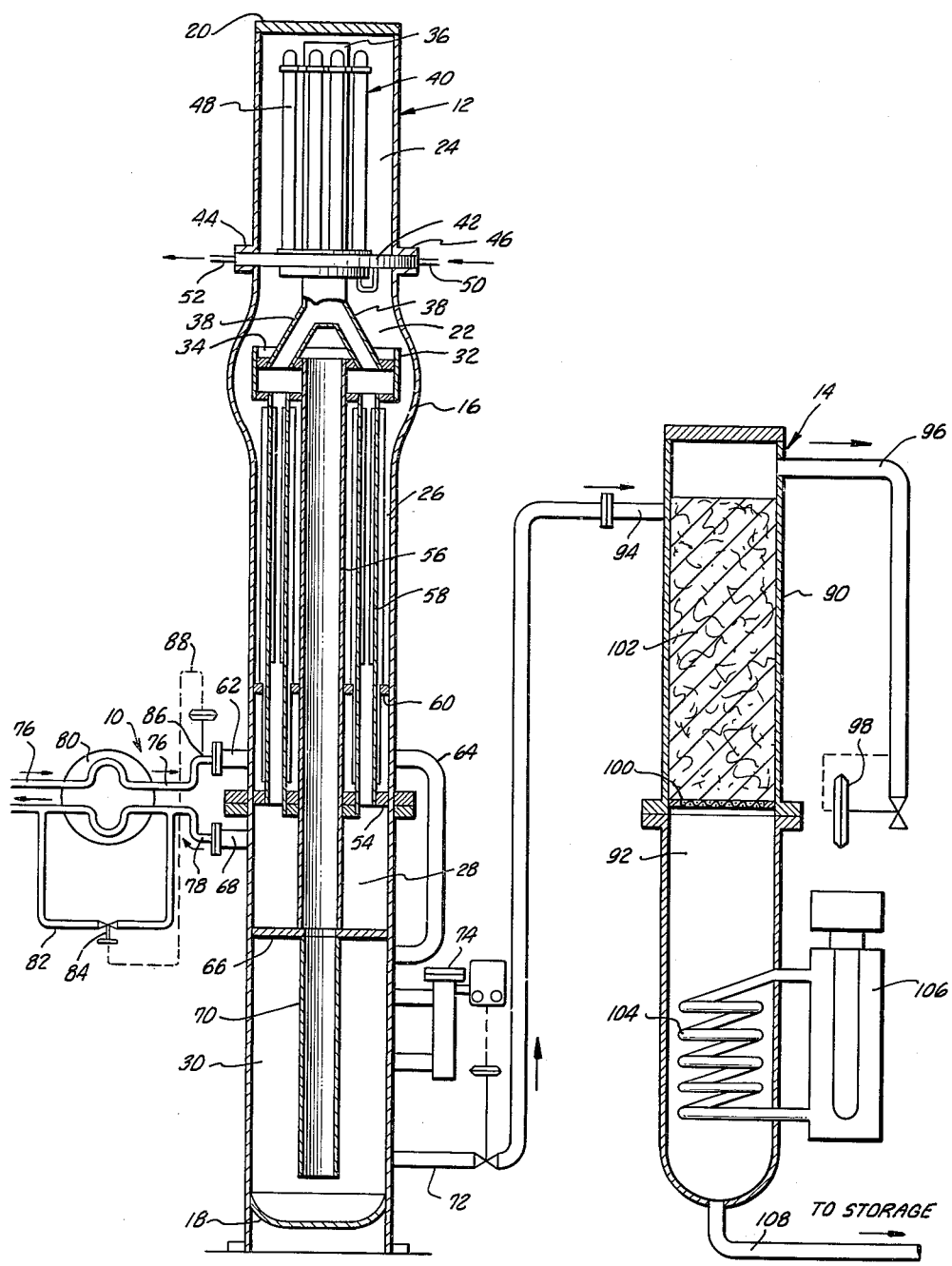
FIG. 1 is a schematic representation of the apparatus of one aspect of my invention in combination with a sectional elevation of an embodiment of a refrigerating rectifier and a schematic representation of a stabilizer column.

With reference to FIG. 1, the apparatus of one aspect of my present invention, generally indicated by reference character 10, is shown in combination with a refrigerating rectifier and a stabilizer column, generally indicated by reference characters 12 and 14, respectively. While the apparatus of my present invention can be advantageously utilized with the refrigerating rectifier and stabilizer hereinafter described, it will be understood that its description therewith is not intended to limit the invention to the particular refrigerating rectifier and stabilizer described.

The refrigerating rectifier comprises an elongate vertical outer shell 16 formed through the use of pipe of suitable diameter. The outer shell is conveniently assembled in sections, the sections being joined together by flanges to produce a column approximately 44 feet in height. A lower internal cap 18 joined to the inside wall of the shell near the bottom of the rectifier, an upper external cap 20 joined to the top of the rectifier and the shell define a fluid-tight enclosure 22 extending substantially the entire length of the rectifier.

For descriptive purposes, it is convenient to consider the enclosure as subdivided into four sections, which are designated as a refrigerating section 24, a heat exchange section 26, a gas outlet section 28, and a liquid-collecting section 30.

The refrigerating section is bounded at its upper longitudinal end by the upper external cap of the rectifier and at its lower longitudinal end by a gas distribution header 32. The gas distribution header is a doughnut-shaped member with a hollow interior. Its outside diameter is less than the inside diameter of the shell. An annular space for the passage of fluids is defined between the outer wall of the header and the inner wall of the shell. To avoid excessive pressure drops and cooling of the flowing gas as occurs during flow through small orifice areas, the shell in the preferred embodiment is belled outwardly to provide an adequate cross-sectional area for the flow of fluids. The upper side of the gas distribution header can be downwardly inclined toward the hole of the doughnut to improve liquid drainage. A strip 34 is joined to the periphery of the header on the upper side to facilitate collection of liquid condensate.

A gas downcomer 36 is disposed coaxially with the shell and centrally within the refrigerating section. The gas downcomer is a pipe open at the top and capped at the bottom and has an outside diameter substantially less than the inside diameter of the shell. The gas downcomer is supported by three tubes 38, of which two are shown, extending laterally and downwardly from near the bottom of the downcomer to the top of the gas distribution header. The tube provides means for flow of fluids from the interior of the downcomer into the interior of the gas distribution header.

A refrigerating unit, generally identified by reference character 40, is positioned in the annular space formed between the outer wall of gas downcomer 36 and the inner wall of outer shell 26. The refrigerating unit shown in this embodiment of the refrigerating rectifier is identical to that described in my copending application Serial No. 46,816, filed August 1, 1960, and is only described herein to the extent necessary for an understanding of the invention. It will be understood that other refrigerating units, such as the helical coils described in my copending application Serial No. 701,581, filed December 9, 1957, now Patent No. 2,964,915, may also be used.

The refrigerating unit includes a central plate 42 having a diameter greater than the diameter of the outer shell. The portion of central plate 42 projecting beyond the outer shell is supported, as by bolts (not shown) between a pair of annular flanges 44, 46 joined to the outer wall of outer shell 26. A plurality of outer heat exchanger tubes 48 project upwardly from the central plate so as to be arcuately disposed in even, spaced-apart relationship in the annular space in which the refrigerating unit is disposed. The central plate defines chambers whereby refrigerating fluid, entering through an intake line 50, passes upwardly and interiorly of the outer heater exchanger tubes, then downwardly through inner tubes (not shown) disposed in each of the outer tubes, and is discharged through a discharge line 52. The central plate also has flow passages (not shown) so that natural gas may pass into the refrigerating section.

The heat exchange section of the rectifier is bounded at its upper longitudinal end by the gas distribution header and at its lower end by a tube sheet 54. The periphery of the tube sheet is joined to the inner wall of the shell thereby sealing this section from the lower sections of the rectifier. A liquid downcomer 56 is disposed coaxially with, and centrally within, the shell. At its upper end, the liquid downcomer passes through the gas distribution header and terminates on the upper side of the header. The liquid downcomer centrally passes through the tube sheet, a fluid-tight seal being formed between the outer wall of the down-comer and the tube sheet.

Nine heat exchanger tubes 58 are arcuately spaced in the annular space within the precooling section formed between the liquid downcomer and the inner wall of the shell and provide a first heat exchanging means. The upper end of each tube is joined to the bottom side of the gas distribution header so as to connect the interior of the header with the interior of the tube. The lower end of each tube passes through the tube sheet and terminates on the bottom side of the tube sheet. A fluid-tight seal is formed between the exterior of each tube and the tube sheet. Between the gas distribution header and the tube sheet, the tubes pass through a baffle plate 60. The baffle plate is located slightly above a feed gas inlet 62 and acts to distribute the incoming feed gas throughout the annular space of the heat exchange section.

The heat exchanger tubes pass through holes in the baffle plate, the holes being slightly larger in diameter than the outside diameter of the tubes. The feed gas passes through these annular spaces between the tubes and the baffle plate since the baffle plate is sealed at its outer diameter to the inner wall of the shell and at its inner diameter to the outer wall of the liquid downcomer. The flow area may be increased by providing an annular opening between the baffle plate and the shell. The flow area required may be easily calculated as a function of the feed gas throughput.

A liquid level pipe 64 is fitted through the shell at a point slightly above the tube sheet and below the feed gas inlet pipe. It externally connects the lower portion of the heat exchange section and the liquid collecting section of the rectifier and maintains a constant liquid level within the former section.

The gas outlet section of the rectifier is bounded at the upper longitudinal end by the tube sheet and at the lower longitudinal end by a support plate 66. The periphery of the support plate is joined to the inner wall of the shell thereby sealing this section from the liquid collecting section below. The liquid downcomer passes centrally through the support plate and terminates on its bottom side. A treated gas outlet 68 passes through the shell and connects the gas outlet section with an external dry gas storage or transmission facilities. As previously described, the bottom ends of the heat exchanger tubes terminate on the bottom side of the tube sheet so that any fluid flowing downwardly through the heat exchanger tubes is discharged into the gas outlet section.

The liquid collecting section is bounded at the upper longitudinal end by the support plate and at the lower longitudinal end by the lower internal cap. As previously described, the liquid downcomer passes centrally through the support plate so that liquid condensate drains into the liquid collecting section. For convenience, a drain pipe 70 having a smaller diameter than the downcomer, depends into the section. The liquid level pipe permits any liquids condensed within the precooling section to drain into the liquid collecting section. A liquid outlet pipe 72 is fitted through the shell near the bottom of the liquid collecting section. A level control valve 74 is also provided in this section.

A feed gas conduit 76 is connected exteriorly of the enclosure to feed gas inlet 62 and joins it in flow communication with a source of feed gas (not shown). A treated gas conduit 78 is connected exteriorly of the enclosure to the treated gas outlet and joins it in flow communication with storage or distribution facilities (not shown). An exterior heat exchanger 80 is adapted to the feed gas conduit and the treated gas conduit so that the feed gas and the treated gas pass through the heat exchanger in indirect heat transfer relationship.

A bypass conduit 82 is joined to the treated gas conduit at either side of the exterior heat exchanger. A flow control valve 84 is located in the bypass conduit. A temperature responsive means 86 is placed in the feed gas conduit at a point between the exterior heat exchanger and the feed gas inlet. The temperature responsive means is adapted, as generally indicated by reference character 88, to the flow control valve in the bypass conduit to open or close it responsive to temperature changes in the feed gas. Any of several commercially available pneumatic or electrical devices for controlling valve openings as a function of temperature changes, for example, a conventional thermostatic type of device adapted to pneumatically position valve 84 responsive to temperature changes, can be used. Other means of controlling the position of valve 84 will be apparent to those skilled in the art.

While stabilizer column 14 for the stabilization of liquid hydrocarbon products produced in the treatment of wet natural gas by the apparatus heretofore described does not form a part of the invention, it is described herein to demonstrate how the liquid products can be conveniently treated. The stabilizer column comprises an outer shell 90 suitably capped at top and bottom to form a fluid-tight enclosure 92 extending the entire length of the column. A stabilizer liquid feed inlet 94 is fitted through the shell near the top of the column and is connected to liquid outlet pipe 72 of the refrigerating rectifier. A stabilizer gas outflow 96, equipped with a pressure relief valve 98, is also fitted through the shell near the top of the column. A support ring 100 is joined to the inner wall of the shell at a point approximately midway of the length of the column. This ring provides support for packing 102, such as saddles, Raschig rings or the like, which substantially fills the upper one-half of the enclosure.

A heating coil 104 is placed near the bottom of the enclosure and is connected to an external heating means 106 such as an electric boiler. A liquid outlet 108 is fitted through the shell at the bottom of the enclosure and is joined to liquid product storage or distribution facilities.

The operation of the refrigerating rectifier in the treatment of wet natural gas and the operation of the apparatus of the aspect of the invention shown in FIG. 1 will be understood by tracing the flow of wet natural gas through the embodiment of the rectifier previously described.

The wet feed natural gas enters the heat exchange section of the rectifier through feed gas inlet 62 and is distributed uniformly throughout the annular space of that section by the baffle plate. The gas flows upwardly around the heat exchanger tubes, then through the annular space between the gas distribution header and the inner wall of the shell. The gas passes through flow passages in the central plate of the refrigerating unit and is cooled by indirect heat transfer with refrigerating fluid as it passes exteriorly of outer tubes 48 of the refrigerating unit. At the top of the refrigerating section, the gas has been cooled and dehydrated to the maximum extent reached during the treatment. The gas then flows sucessively downwardly through the gas downcomer and, after being distributed in the gas distribution header, through the heat exchanger tubes into the gas outlet section. From the gas outlet section, it passes through treated gas outlet 68 of the rectifier to storage or gas transmission facilities.

Liquid condensation occurs within the rectifier in both the heat exchange section and the refrigerating section. In the heat exchange section, the condensed hydrocarbon constituents and water are collected on the top of the tube sheet and overflow into the liquid collecting section through the liquid level pipe. The hydrocarbon constituents are condensed throughout the length of the heat exchange section and flow downwardly counter to the upflowing wet feed natural gas. As a result, a continuous process of fractionation and stripping occurs by which the high vapor-pressure components are stripped from the hydrocarbon condensate.

The hydrocarbon constituents condensed in the refrigerating section are collected on the upper surface of the gas distribution header. The small amount of water condensed in this section clings to the outer tubes as a hydrate. The hydrocarbon liquid flows downwardly by gravity through the liquid downcomer into the liquid collecting section. The downflowing liquid flows as a film along the inner wall of the downcomer, thereby promoting maximum heat transfer efficiency. Since the liquid downcomer is externally surrounded by the upflowing feed natural gas, a heat exchange occurs through the wall of the downcomer between the gas and the film of condensed liquids. In this manner, high vapor-pressure components are removed from the downflowing hydrocarbon condensate while the upflowing feed gas is simultaneously cooled.

For further stabilization of the hydrocarbon condensate, the liquid products are passed from the liquid collecting section through the liquid outlet pipe into the top of a stabilizing column.

The treated natural gas leaves treated gas outlet 68 and flows by means of treated gas conduit 78 through exterior heat exchanger 80 and then to storage or distribution. Feed natural gas flows from a source of natural gas by means of feed gas conduit 76 through exterior heat exchanger 80 and enters the refrigerating rectifier through feed gas inlet 62. Within the exterior heat exchanger, the feed natural gas is cooled by passing in indirect heat exchange relationship with the cold treated natural gas leaving the refrigerating rectifier. However, it is cooled only to an extent so that its hydrate temperature is not reached. To achieve this result, all, some, or none of the treated dry natural gas is passed through bypass conduit 82, dependent upon the temperature of the feed natural gas leaving the exterior heat exchanger and the relation of this temperature to the hydrate temperature of the feed natural gas. The amount of treated dry natural gas passing through the bypass conduit is controlled by flow-control valve 84 acting in response to the temperature responsive means in the feed natural gas conduit.

Where a specific feed natural gas having a given hydrate temperature determined by its hydrocarbon components and the pressure is passed through the apparatus of the present invention, changes in ambient temperature can result in changes in the amount of treated natural gas passed in heat transfer relationship with the feed natural gas so that the latter is maintained at a temperature above its hydrate temperature.

Although the temperature of two different feed natural gases entering the exterior heat exchanger is the same, the temperature of the two gases after passing in heat exchange relationship with a given volume of treated natural gas at a particular temperature can be significantly different. This may be demonstrated by the following table in which three different gases are compared following heat exchange in the exterior heat exchanger with the total amount of treated natural gas leaving the refrigerating rectifier. The temperatures given are with reference to inflow and outflow in the exterior heat exchanger.

Table

|  | I | II | III |
|---|---|---|---|
| Methane, vol. percent | 90.5 | 85.5 | 76.5 |
| Ethane, vol. percent | 4.0 | 6.0 | 10.0 |
| Propane, vol. percent | 3.0 | 5.0 | 9.0 |
| Butanes, vol. percent | 1.5 | 2.0 | 2.5 |
| Pentanes and heavier, vol. percent | 1.0 | 1.5 | 2.0 |
| Total, vol. percent | 100.0 | 100.0 | 100.0 |
| Feed natural gas, inlet temp., °F | 100 | 100 | 100 |
| Treated natural gas, inlet temp., °F | 20 | 20 | 20 |
| Feed natural gas, outflow temp., °F | 42 | 53 | 65 |
| Hydrate point at 400 p.s.i.g | 50 | 53 | 56 |

The differences in the outflow temperatures of the three feed natural gases are the result of differences in the amount of condensable hydrocarbons present in each. With respect to gas I, nearly all of the heat absorbed by the treated gas from the feed gas results in a reduction in the temperature of the feed gas because very little condensation of hydrocarbons occurs in a gas having the composition of gas I. On the other hand, with respect to gas III, a substantial portion of the heat absorbed by the treated natural gas (about 40%) is latent heat of condensation as a result of condensation of higher molecular weight hydrocarbons, so that the reduction in temperature of the feed gas itself is not as great. It will be apparent that in the use of the apparatus and method of the invention only a fraction of the treated natural gas is passed in indirect heat transfer relationship with feed gas I in order to prevent cooling it below its hydrate temperature. However, with reference to feed gas III, all of the treated gas leaving the refrigerating rectifier can be used to precool the feed gas. In the case of feed gas II, a major fraction of the treated gas leaving the refrigerating rectifier can be used to precool the feed gas, as the use of all of it reduces the temperature of the feed gas to its hydrate temperature.

In the case of certain gases, the apparatus of my present invention enables elimination of the plurality of vertical heat exchanger tubes in the heat exchange section of the refrigerating rectifier. This condition exists when full heat exchange may be performed in the exterior heat exchanger without lowering the temperature of the feed natural gas leaving the exterior heat exchanger to a temperature below its hydrate temperature. Gas III is an example of such a gas. Accordingly, where such a gas is being treated it is possible to utilize the embodiment of the refrigerating rectifier shown in FIG. 2. The refrigerating rectifier in FIG. 2, generally identified by reference character 110, is identical in all respects to the refrigerating rectifier of FIG. 1 with the exception that the heat exchanging tubes in the heat exchange section of FIG. 1 have been eliminated. The rectifier consists of a refrigerating section 112, an inlet chamber 114, a gas outlet section 116, and a liquid collecting section 118. A refrigerating unit 120, identical to that described with reference to FIG. 1, is located in the refrigerating section. A liquid level pipe 122 interconnects inlet chamber 116 and liquid collecting section 118.

Feed natural gas passes through a feed gas conduit 124 and a feed gas inlet 126 and enters the inlet chamber of the rectifier. The gas is cooled as it passes upwardly across the refrigerating unit. The cold treated natural gas flows downwardly through a gas downcomer 128 and is discharged into gas outlet section 114. A treated gas outlet 130 connects the gas outlet section to a treated gas conduit 132. A heat exchanger 134, located exteriorly of the refrigerating rectifier, is adapted to the feed gas conduit and the treated gas conduit whereby the treated gas and feed gas flow through it in indirect heat exchange relationship. A bypass conduit 136, a flow control valve 138, and a temperature responsive means 140 function in a manner identical to that previously described with reference to FIG. 1.

Condensed liquids are collected in liquid collecting section 118 and are discharged through a liquid outflow pipe 142 in the bottom of that section.

The embodiment of the refrigerating rectifier disclosed in FIG. 2 is much simpler and therefore more economical than the refrigerating rectifier described with reference to FIG. 1. It will be appreciated, however, that its use is limited to certain feed natural gases treated in the exterior heat exchanger as heretofore described. It will be further appreciated that, in view of the elimination of the vertical heat exchanger tubes in the refrigerating rectifier, the embodiment shown in FIG. 2 can be even further simplified. For example, gas downcomer 128 can be eliminated and the rectifier adapted so that the treated gas is discharged from the top of the rectifier and then utilized in exterior heat exchanger 134 as previously described. It is apparent that such modifications are within the scope of the present invention.

With reference to FIG. 3, another aspect of my present invention is schematically shown. A refrigerating rectifier 150, identical to the rectifier described with reference to FIG. 1 or, where appropriate, FIG. 2, is joined to a feed gas conduit 152 and a treated gas conduit 154. A heat exchanger 156 is adapted to the feed gas conduit and the treated gas conduit whereby the treated gas and feed gas flow through it in indirect heat exchange relationship with each other. A bypass conduit 158 is connected to the treated gas conduit so that treated gas may be bypassed around the heat exchanger. A flow control valve 160 is located in the bypass conduit. A temperature responsive means 162, identical to the type described with reference to FIG. 1, is adapted to valve 160 so that the extent to which it is open is responsive to the temperature of the feed gas in the feed gas conduit.

A low pressure gas stream from secondary crude oil traps, heaters, tanks or the like enters a conventional separator 164 by means of line 166. Within the separator, the low-pressure gas stream is segregated into a liquid phase and a gas phase. The liquid phase is connected by a liquid conduit 168 to the feed gas conduit at a point between heat exchanger 156 and rectifier 150. A flow-control valve 170 is positioned in the liquid conduit and is adapted to temperature responsive means 162 so that the extent to which it is open is responsive to changes in temperature of the feed gas. Low-pressure gas from separator 164 is connected to the feed gas conduit by a line 172 at a point upstream of heat exchanger 156.

In operation, the apparatus disclosed in FIG. 3 functions the same as that described with reference to FIG. 1 insofar as control of the temperature of the feed gas within the heat exchanger is concerned. In addition, dependent upon the temperature of the feed gas leaving the heat exchanger, liquid hydrocarbons are added to the feed gas conduit immediately preceding entry of the feed gas into rectifier 150. For the reasons heretofore described, cooling of the feed gas is thereby obtained, provided that the liquid hydrocarbon added is richer in vaporizable components than any liquid that may be in equilibrium with the main gas stream flowing through the feed gas conduit.

The apparatus for adding liquid hydrocarbons to the feed gas as described in conjunction with FIG. 3 may be advantageously utilized independently of the apparatus for control of the temperature within the heat exchanger. The two, however, may also be combined to produce a marked over-all increase in operating efficiency of the rectifier.

I claim:

1. In combination with a refrigerating rectifier for treatment of a stream of natural gas and including a feed gas inlet and a treated gas outlet, a feed gas conduit connecting the feed gas inlet and a source of feed gas, a treated gas conduit connecting the treated gas outlet and a point of distribution, heat exchanging means exterior of the refrigerating rectifier and adapted to the feed gas conduit and the treated gas conduit whereby the feed gas and treated gas flow therethrough in indirect heat transfer relationship, temperature responsive means in the feed gas conduit between the heat exchanging means and the feed gas inlet, a bypass conduit connected to the treated gas conduit to bypass the heat exchanging means, first flow-control means in the bypass conduit, the temperature responsive means and the first flow-control means adapted whereby the amount of treated gas passing through the bypass conduit is responsive to the temperature of the feed gas, a liquid conduit connected to the feed gas conduit between the heat exchanging means and the feed gas inlet and joining the feed gas conduit and a source of liquid hydrocarbons, and second flow-control means in the liquid conduit, the temperature responsive means and the second flow-control means adapted whereby the amount of liquid hydrocarbons flowing through the liquid conduit into the feed gas conduit is responsive to the temperature of the feed gas.

2. In combination with a refrigerating rectifier for treatment of a stream of natural gas and including a feed gas inlet and a treated gas outlet, a feed gas conduit connecting the feed gas inlet and a source of feed gas, a treated gas conduit connecting the treated gas outlet and a point of distribution, heat exchanging means exterior of the refrigerating rectifier and adapted to the feed gas conduit and the treated gas conduit whereby the feed gas and treated gas flow therethrough in indirect heat transfer relationship, temperature responsive means in the feed gas conduit between the heat exchanging means and the feed gas inlet, a liquid conduit connected to the feed gas conduit between the heat exchanging means and the feed gas inlet and joining the feed gas conduit and a source of liquid hydrocarbons, and flow-control means in the liquid conduit, the temperature responsive means and flow-control means adapted whereby the amount of liquid passing through the liquid conduit and into the feed gas conduit is responsive to the temperature of the feed gas.

3. In combination with a refrigerating rectifier for the treatment of a stream of natural gas comprising an elongated vertical shell closed at its longitudinal ends to form a fluid-tight enclosure, a feed gas inlet for admitting feed gas to the enclosure, first tubular heat exchanging means within the enclosure, second tubular heat exchanging means within the enclosure above the first heat exchanging means and adapted for receiving interiorly a refrigerating fluid, means for directing feed gas upwardly across the exteriors of the first and second heat exchanging means successively, means adapted for transmitting gas passing across the second heat exchanging means into the interior of one end of the first heat exchanging means, means disposed below the second heat exchanging means for directing substantially all of the liquids condensed from the gas passing across the second heat exchanging means downwardly in countercurrent heat transfer relationship with the feed gas, a treated gas outlet in flow communication with the interior of the other end of the first heat exchanging means, and a liquid outlet in the lower part of the enclosure, apparatus including a feed gas conduit connecting the feed gas inlet and a source of feed gas, a treated gas conduit connecting the treated gas outlet and a point of distribution, heat exchanging means exterior of the refrigerating rectifier and adapted to the feed gas conduit and the treated gas conduit whereby the feed gas and treated gas flow therethrough in indirect heat transfer relationship, temperature responsive means in the feed gas conduit between the heat exchanging means and the feed gas inlet, a liquid conduit connected to the feed gas conduit between the heat exchanging means and the feed gas inlet and joining the feed gas conduit and a source of liquid hydrocarbons, and flow-control means in the liquid conduit, the temperature responsive means and the flow-control means adapted whereby the amount of liquid passing through the liquid conduit and into the feed gas conduit is responsive to the temperature of the feed gas.

References Cited in the file of this patent

UNITED STATES PATENTS

| | | |
|---|---|---|
| 2,222,276 | Babcock | Nov. 19, 1940 |
| 2,689,875 | Hachmuth et al. | Sept. 21, 1954 |
| 2,951,347 | Spangler et al. | Sept. 6, 1960 |
| 2,964,915 | Hull | Dec. 20, 1960 |
| 2,973,834 | Cicalese | Mar. 7, 1961 |